(12) United States Patent
Heyes

(10) Patent No.: US 6,406,253 B2
(45) Date of Patent: Jun. 18, 2002

(54) TURBOCHARGER

(75) Inventor: Francis Joseph Geoffrey Heyes, Lincoln (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/798,772

(22) Filed: Mar. 2, 2001

(30) Foreign Application Priority Data

Mar. 4, 2000 (GB) .............................................. 0005157

(51) Int. Cl.$^7$ ................................................ F01D 11/00
(52) U.S. Cl. .................... 415/111; 415/230; 415/174.2; 277/420; 417/407
(58) Field of Search .............................. 415/111, 174.5, 415/171.1, 230, 174.3, 174.2; 277/420, 419, 418; 417/407, 423.1

(56) References Cited

U.S. PATENT DOCUMENTS 4,253,031 A * 2/1981 Frister .......................... 290/52
5,066,192 A 11/1991 Honda et al.

FOREIGN PATENT DOCUMENTS

GB 2 023 241 A 12/1979
WO WO 94/12793 6/1994

* cited by examiner

*Primary Examiner*—Edward K. Look
*Assistant Examiner*—James M McAleenan
(74) *Attorney, Agent, or Firm*—Kirschstein, et al.

(57) ABSTRACT

A turbocharger for an internal combustion engine is of the type having an impeller mounted on a shaft carried by a bearing supplied with lubricating oil, the shaft being located in a bore and having an oil and air seal between the bearing and the impeller hub. The seal is a floating ring seal mounted in the bore and extending radially into a circumferential recess in the impeller hub. In use, the ring seal experiences a pressure differential across it which urges it to slide axially along the bore so that it forms a sealing interface with a side face of the recess. The shaft rotates relative to the ring seal, which is therefore subject to wear against the side face of the recess. Hence, a shoulder is provided in the bore to limit excessive axial sliding of the ring seal due to wearing away of the ring seal against the side face of the recess. Sealing performance is improved and rate of wear of the ring seal is reduced by providing the ring seal with at least one inwardly-facing annular groove and providing the recess with a circumferential rib corresponding to each groove, each rib being receivable in a groove, whereby under the pressure differential a side of each groove forms a sealing interface with a side of the corresponding rib.

6 Claims, 1 Drawing Sheet

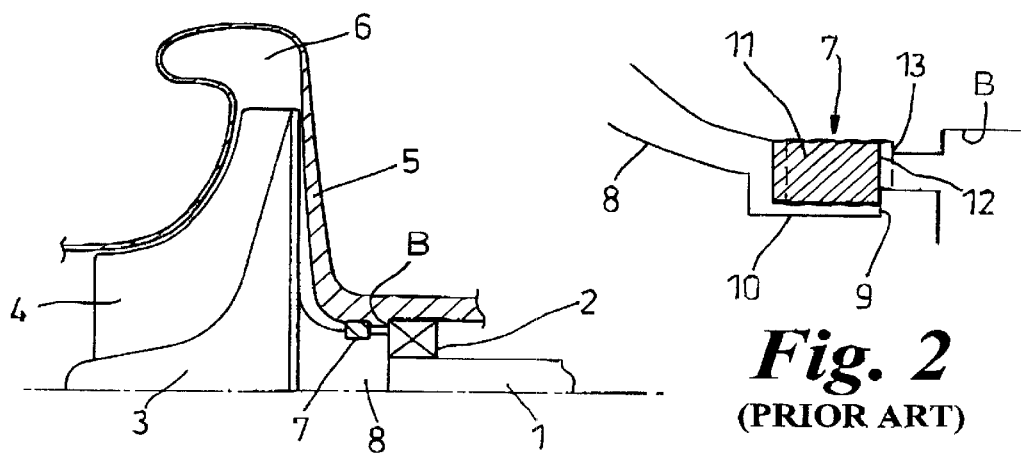
Fig. 1
(PRIOR ART)
Fig. 2
(PRIOR ART)
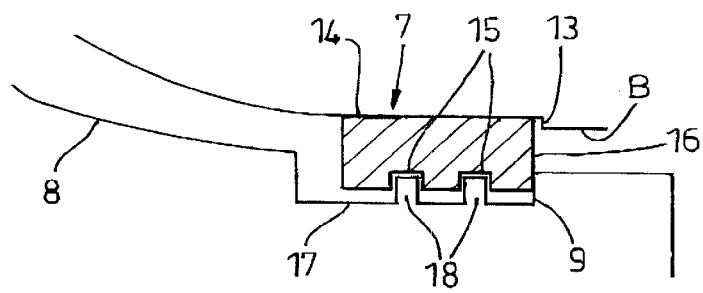
Fig. 3
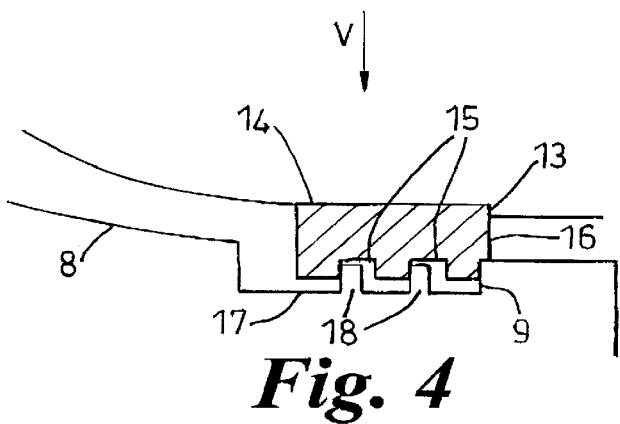
Fig. 4
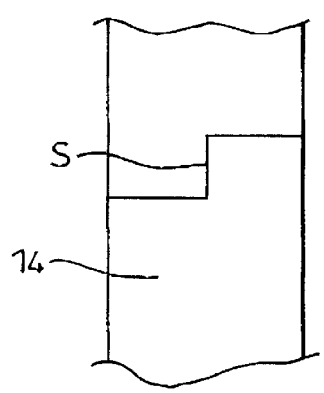
Fig. 5

TURBOCHARGER

FIELD OF THE INVENTION

This invention relates to an exhaust gas-driven turbocharger for an internal combustion engine.

BACKGROUND OF THE INVENTION

Turbochargers for internal combustion engines generally comprise an engine exhaust-driven turbine which in turn drives an engine air inlet compressor. The turbine and compressor sections may be fixed to a common shaft so that the turbine may directly drive the compressor, and the shaft bearings may be lubricated with oil from the engine sump.

With such an arrangement, there is a known potential for air leakage from the compressor section volute through the shaft bearings and into the engine sump (known as "blow-by"). This may cause the sump to be pressurized, with consequent ill effect on the engine. Also, for large industrial engines it is common to prime the turbocharger shaft bearings with oil prior to startup of the engine. With inadequate oil sealing for the bearings, oil can leak on to the back face of the compressor impeller. When the impeller starts to rotate, the leaked oil will be thrown outwards to mix with the compressor air, so entering the combustion chambers of the engine, again with possible detrimental effect on the engine.

In an attempt to solve this problem, an annular metal seal in the manner of a piston ring has been provided to isolate the bearing from the compressor volute. This ring seal is a sliding or "floating" fit in a bore of a casing surrounding the shaft and projects into a groove in the hub of the impeller to form a sealing interface therewith.

While this arrangement may be acceptable in relatively small turbochargers, it is less satisfactory in larger turbochargers where the boost pressure is high. Blow-by pressure in larger turbochargers forces the ring seal to move axially in the casing bore towards the shaft bearing. This causes the ring seal to contact a side face of its locating groove. While this is desirable for establishment of a good seal, it causes the ring seal to wear until it eventually abuts a shoulder in the casing bore (to provide a limit to further axial movement of the ring seal). At this point, further wear of the side face of the ring seal against the side face of the groove will tend to lead to the formation of a gap between the ring seal and the side face of the groove, reducing the effectiveness of the seal.

SUMMARY OF THE INVENTION

According to the invention, there is provided a turbocharger for an internal combustion engine, comprising:
a casing defining a bore,
a bearing housed within the bore,
impeller shaft means mounted in the bearing for rotation within the bore, and
a floating ring seal located in the bore adjacent the bearing and extending radially into a circumferential recess in the shaft means, the ring seal being subject in use to a pressure differential there across which urges it to slide along the bore in a predetermined axial direction such that it bears against a side face of the recess to form a sealing interface therewith, the ring seal being subject to wear against the side face due to relative rotation therebetween, and a shoulder being provided in the bore to limit excessive axial sliding of the ring seal due to wearing away of the ring seal against the side face of the recess. The sealing performance is improved and the rate of wear of the ring seal is reduced by providing the ring seal with at least one inwardly-facing annular groove and providing the recess with a circumferential rib corresponding to each groove, each rib being receivable in a groove, whereby under the pressure differential a side of each groove forms a sealing interface with a side of the corresponding rib.

As the side face of the ring seal wears, it moves towards the bearing but the wear is shared across side faces of the grooves as well, reducing the rate at which wear occurs. Compared with the prior art, the provision of one or more extra seal interfaces in series with the interface between the ring seal and the side of the recess, means that each interface is required to accommodate only part of the overall pressure differential, and therefore each does not have to be as efficient as a single interface for a given total pressure drop. Over time, seal wear will continue until the ring seal contacts the shoulder in the bore, whereupon small gaps will form equally at the grooves/ribs and ring seal/recess interfaces. However, the combination of these sealing interfaces will still be more efficient than the ring seal/recess interface on its own, because of the sinuous nature of the leakage path and the presence of oil in the gaps.

The shaft means in which the recess is provided may comprise a central hub of the impeller.

The ring seal preferably has a plurality of inwardly-facing annular grooves, the recess being provided with a corresponding plurality of circumferential ribs. For example, two annular grooves may be provided, with two ribs to be received into them. The ring seal may be formed of metal, for example cast iron, the shaft being steel, preferably nitro-carburized. In an alternative embodiment, the ring seal is formed of a plastics material.

To facilitate fitting of the ring seal on to the shaft, it is suitably split in the manner of an engine piston ring. For example, the split may have a dog-leg configuration, extending over half the width of the ring, then circumferentially of the ring for a short way before extending across the remainder of the width of the ring.

The air/oil seal used in the turbocharger of the invention extends the working life of the turbocharger by maintaining satisfactory sealing performance in both directions for a much longer time than conventional ring seals. At the same time, the simple construction of the ring seal ensures that the cost of manufacture of the turbocharger is not increased significantly.

The invention also provides an internal combustion engine fitted with a turbocharger in accordance with the invention.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a diagrammatic part-sectional view of a portion of a turbocharger having a floating ring seal in accordance with the prior art;

FIG. 2 is an enlarged sectional view of the ring seal in the prior art turbocharger shown in FIG. 1;

FIG. 3 is a corresponding view to that of FIG. 2, showing a ring seal in accordance with one embodiment of the invention, newly installed;

FIG. 4 is the same view as in FIG. 3, but showing the ring seal after wear; and

FIG. 5 is a partial view on the ring seal of FIG. 4 in the direction of arrow V.

DETAILED DESCRIPTION OF THE PREFERRED EMBODIMENTS

In the prior art turbocharger shown in FIGS. 1 and 2 a shaft 1 is carried by a bearing 2 and mounted on one end of the shaft by means of a central hub 8 is an impeller 3 with radial blading 4. The other end of the shaft carries the exhaust-gas driven turbine (not shown) which powers the compressor. The turbocharger has an outer casing 5 in which the components are mounted, the casing being formed into a compressed air volute 6 from which compressed air is fed to the inlet manifold of the internal combustion engine to which the turbocharger is connected. The bearing 2 is isolated from the pressure of the air in the volute 6 by means of a seal 7 located between the hub 8 of the impeller 3 and a bore B of the casing 5, as may be seen in more detail in FIG. 2.

The seal 7 comprises a floating ring seal 11 seated in the bore B and extending radially from the bore into a circumferential groove 10 formed around the hub 8. The blow-by air pressure causes the ring seal 11 to slide in its groove 10 axially of the hub 8 and bore B towards the bearing 2, initially coming to rest against the right-hand side 9 of the groove 10, against which the side face 12 of the ring seal forms a substantially air- and oil-tight sealing interface. As there is relative rotation between the ring seal 11 and the side 9, wear of the ring seal occurs. An abutment shoulder 13 in the bore B of the casing is spaced axially from the side 9 of the groove 10 to provide a limit to the axial movement of the ring seal 11 towards the bearing 2 as wear occurs. The position and shape of the ring seal 11 at the limit of wear are illustrated by the broken line in FIG. 2. It will be seen that further wear between the ring seal and the moving hub will result in the clearance between the side 9 of the groove 10 and the face 12 of the ring seal 11 increasing, thereby reducing the effectiveness of the air seal. Furthermore, at start up, the oil pressure can cause leakage of oil back to the compressor, especially if the pressure causes the ring seal to move axially away from the bearing.

FIGS. 3 and 4 illustrate the seal used in the turbocharger of the invention. The ring seal 14 is formed with grooves 15 extending around the inside thereof. While two spaced grooves 15 are shown, it will be appreciated that there may be a greater number, or possibly just one. The recess 17 in the hub 8 is formed with two circumferential ribs 18 dimensioned to be received in grooves 15 while allowing free rotation of the hub 8 relative to the ring seal 14. In the position shown in FIG. 3, the ring seal 14 is new and unworn, and its side face 16 abuts against the side of the recess 17 to form a sealing interface therewith in the same manner as in the prior art arrangement illustrated in FIG. 1. However, the sinuous or labyrinthine path formed between the grooves 15 and the ribs 18 serves to enhance the oil-sealing effect at start-up.

As the side face 16 of the ring seal 14 wears in use, it moves towards the bearing as described hereinbefore with reference to FIGS. 1 and 2. Because of the presence of the ribs 18 in the grooves 15, the wear is not all concentrated on the side face 16, as previously, but is shared across side faces of the grooves as well, reducing the rate at which wear occurs. In addition, provided that the grooves and ribs are axially dimensioned with suitable tolerances, the side faces of all ribs and grooves will eventually make intimate sealing contact with each other. The grooves 15 in the ring 14 will continue to wear until the ring 14 contacts the shoulder 13, as illustrated in FIG. 4, and then small gaps will form equally at the adjacent faces of the grooves and ribs. The provision of two or more seals in series means that each is required to accommodate only part of the overall pressure differential, and therefore each does not have to be as efficient as one single seal for a given total pressure drop. Also, the meniscus effect of any oil in the small gaps tends to resist oil leakage flow from the shaft bearing region during start-up. Thus, the seal used in the turbocharger of the invention provides effective control of air flow in one direction and oil flow in the reverse direction.

To facilitate fitting of the ring seal on to the shaft, it may be suitably split in the manner of an engine piston ring. As shown in FIG. 5, the split S may have a dog-leg configuration, extending over half the width of the ring seal 14, then circumferentially of the ring seal for a short way before extending across the remainder of the width of the ring seal.

It will be understood that each of the elements described above, or two or more together, also may find a useful application in other types of constructions differing from the types described above.

While the invention has been illustrated and described as embodied in a turbocharger, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A turbocharger for an internal combustion engine, comprising:
   a) a casing defining a bore,
   b) a bearing housed within the bore,
   c) impeller shaft means mounted in the bearing for rotation within the bore,
   d) a floating ring seal located in the bore adjacent the bearing and extending radially into a circumferential recess in the shaft means, the ring seal being subject in use to a pressure differential thereacross which urges the ring seal to slide along the bore in an axial direction such that the ring seal bears against a side face of the recess to form a sealing interface therewith, the ring seal being subject to wear against the side face due to relative rotation therebetween,
   e) a shoulder being provided in the bore to limit excessive axial sliding of the ring seal due to wearing away of the ring seal against the side face of the recess, and
   f) at least one inwardly-facing annular groove provided with the ring seal, and a circumferential rib provided with the recess and corresponding to each groove, each rib being receivable in a respective groove, whereby under the pressure differential a side of each groove forms a sealing interface with a side of the corresponding rib to enhance sealing performance and reduce rate of wear of the ring seal.

2. The turbocharger according to claim 1, wherein the shaft means in which the recess is provided comprises a central hub of an impeller.

3. The turbocharger according to claim 1, wherein the ring seal has a plurality of the inwardly-facing annular grooves, and wherein the recess is provided with a corresponding plurality of the circumferential ribs.

4. The turbocharger according to claim 3, wherein the ring seal is provided with two annular grooves.

5. The turbocharger according to claim 1, in which the ring seal is a split ring, being divided by a split having a dog-leg configuration, the split extending over half a width of the ring seal, then circumferentially of the ring seal for a short way before extending across the remainder of the width of the ring seal.

6. An internal combustion engine including a turbocharger, comprising:

a) a casing defining a bore, b) a bearing housed within the bore, c) impeller shaft means mounted in the bearing for rotation within the bore, d) a floating ring seal located in the bore adjacent the bearing and extending radially into a circumferential recess in the shaft means, the ring seal being subject in use to a pressure differential thereacross which urges the ring seal to slide along the bore in an axial direction such that the ring seal bears against a side face of the recess to form a sealing interface therewith, the ring seal being subject to wear against the side face due to relative rotation therebetween, e) a shoulder being provided in the bore to limit excessive axial sliding of the ring seal due to wearing away of the ring seal against the side face of the recess, and f) at least one inwardly-facing annular groove provided with the ring seal, and a circumferential rib provided with the recess and corresponding to each groove, each rib being receivable in a respective groove, whereby under the pressure differential a side of each groove forms a sealing interface with a side of the corresponding rib to enhance sealing performance and reduce rate of wear of the ring seal.

* * * * *